US005558369A

United States Patent [19]
Cornea et al.

[11] Patent Number: 5,558,369
[45] Date of Patent: Sep. 24, 1996

[54] TAPPING PLATE AND RETENTION BRACKET ASSEMBLY

[75] Inventors: Joel T. Cornea, Ortonville; Andrew J. Tomlin, Harrison Township, both of Mich.

[73] Assignee: Chrysler Corporation, Highland Park, Mich.

[21] Appl. No.: 492,882

[22] Filed: Jun. 20, 1995

[51] Int. Cl.⁶ .......................... B62D 21/02; F16B 37/00; F16B 37/06
[52] U.S. Cl. .................. 280/800; 280/781; 411/104; 296/204; 296/29
[58] Field of Search .................... 280/781, 785, 280/788, 800; 411/104, 84, 85, 112, 113, 111; 296/29, 30, 204

[56] References Cited

U.S. PATENT DOCUMENTS

| | | | |
|---|---|---|---|
| 1,464,216 | 8/1923 | Paden | 411/103 |
| 1,820,064 | 8/1931 | Green | 411/103 |
| 2,310,532 | 2/1943 | Langmaid | 411/103 |
| 2,477,429 | 7/1949 | Swanstrom et al. | 411/104 |
| 2,633,886 | 4/1953 | Tinnerman | 411/112 |
| 2,825,380 | 3/1958 | Reiner | 411/113 |
| 2,948,316 | 8/1960 | Sing et al. | 411/103 |
| 3,149,856 | 9/1964 | Schilberg | 296/204 |
| 3,986,544 | 10/1976 | Jones et al. | 411/103 |
| 4,015,650 | 4/1977 | Anderson | 411/103 |
| 4,059,286 | 11/1977 | Otto et al. | 280/673 |
| 4,875,816 | 10/1989 | Peterson | 411/104 |
| 5,193,643 | 3/1993 | McIntyre | 411/104 |
| 5,193,868 | 3/1993 | O'Toole | 411/103 |
| 5,409,289 | 4/1995 | Kalian et al. | 411/104 |

FOREIGN PATENT DOCUMENTS

| | | | |
|---|---|---|---|
| 63-227477 | 9/1988 | Japan | 280/788 |
| 4-90975 | 3/1992 | Japan | 280/788 |
| 5-162655 | 6/1993 | Japan | 280/781 |

*Primary Examiner*—Eric D. Culbreth
*Assistant Examiner*—Peter C. English
*Attorney, Agent, or Firm*—Thomas G. Pasternak

[57] ABSTRACT

An improved tapping plate and retention bracket assembly adjustably attaches a member, by means of a threaded bolt, to a web pedestal formed in a vehicle body frame. The bracket is formed from a single blank of sheet metal for enclosing a tapping plate, having a threaded bore for receiving the bolt, with the plate adapted to slidably seat on a central section of the bracket for controlled movement thereon. Forward and aft tongues, which extend from respective forward and aft transverse edges of the section, are adapted to overlie forward and aft frame web portions for welded attachment thereto. The bracket tongues, in addition to reinforcing the horizontally disposed pedestal, provide the sole means to secure the retention bracket to the pedestal, thereby obviating welding distortion of the bracket central section and the pedestal.

9 Claims, 2 Drawing Sheets

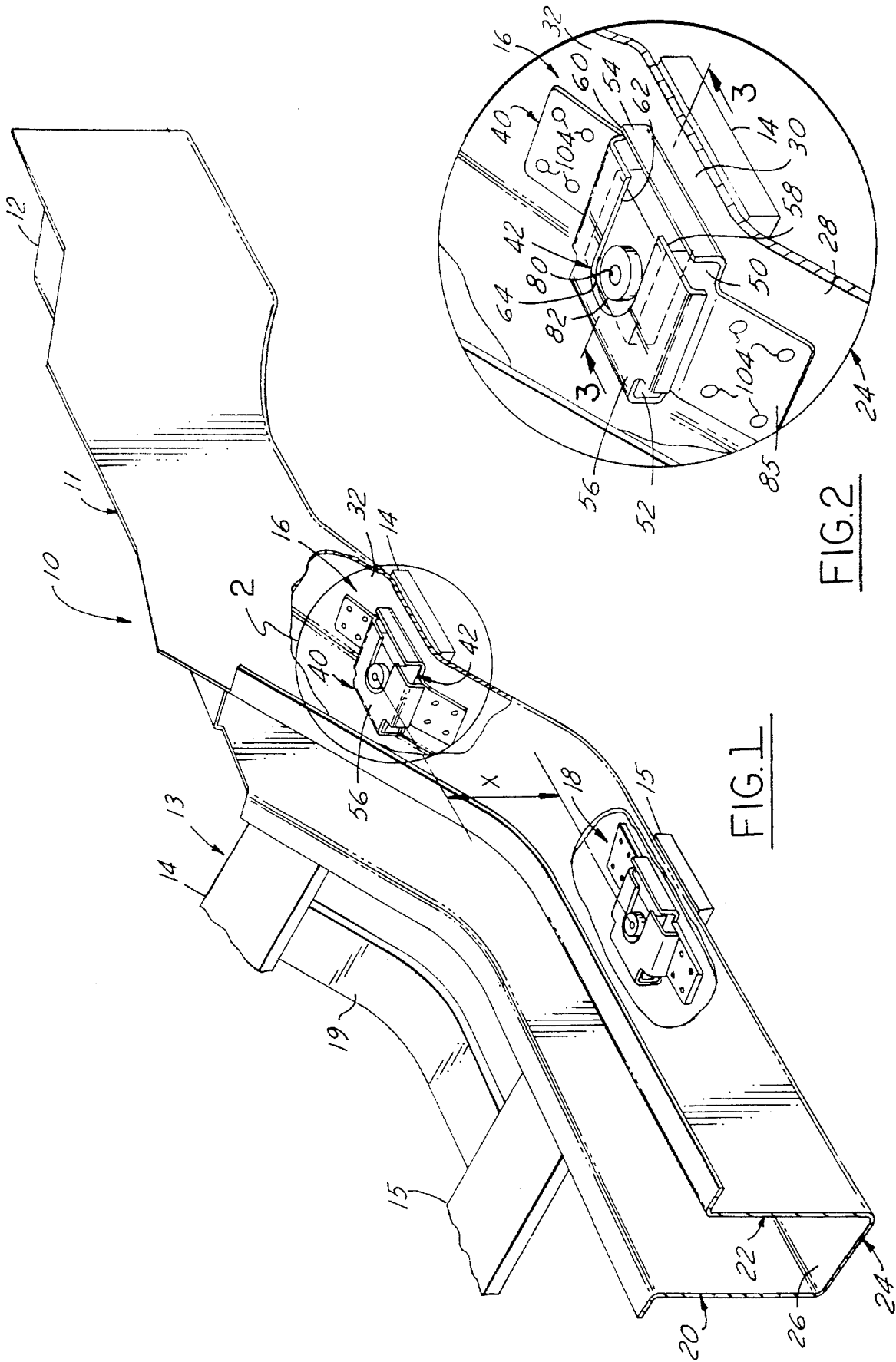

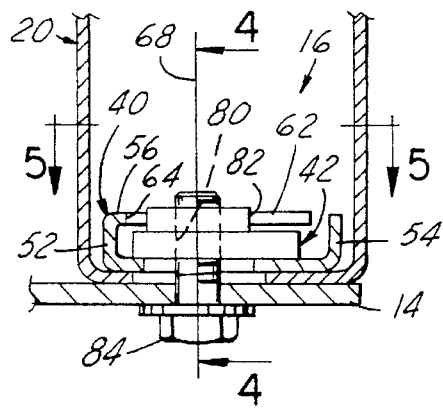
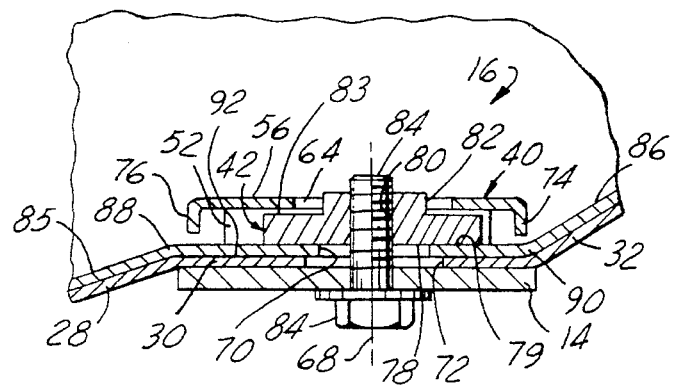
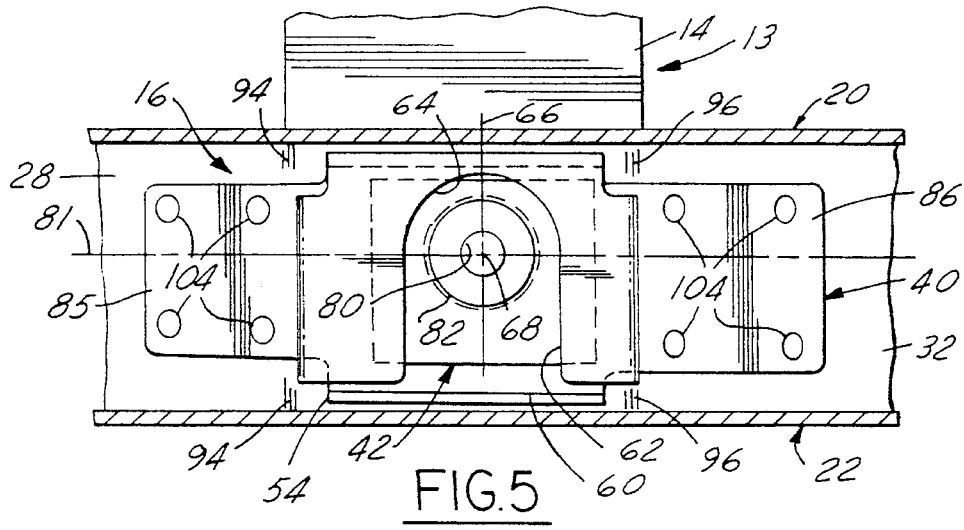
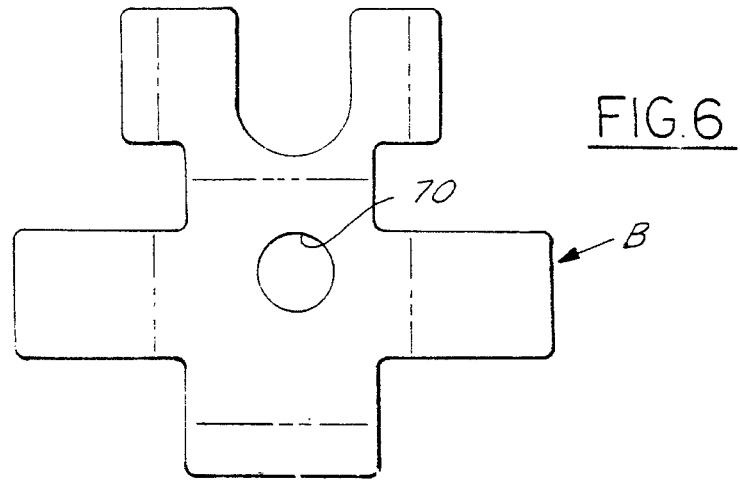

TAPPING PLATE AND RETENTION BRACKET ASSEMBLY

FIELD OF THE INVENTION

This invention relates to adjustable tapping plate assemblies and, more particularly, to a floating tapping plate and retention bracket assembly for threadably securing a bolt to a vehicle frame.

BACKGROUND OF THE INVENTION

It is known in the art to provide a floating tapping plate assembly for anchoring a threaded bolt to a vehicle body support structure in an adjustable manner. U.S. Pat. No. 5,193,868, issued Mar. 16, 1993 to O'Toole, discloses an example of such a floating tapping plate and sheet metal retention bracket assembly for a vehicle body.

U.S. Pat. No. 4,015,650, issued Apr. 5, 1977, to Anderson, discloses a caged nut for mounting a threaded nut on a surface which comprises a housing of box-like structure formed of a single blank of sheet metal. The housing has mounting flanges extending outwardly therefrom enabling the housing to be welded to a supporting surface.

SUMMARY OF THE INVENTION

It is a feature of the present invention to provide an improved tapping plate and retention bracket mounting installation for a vehicle frame structure, by which a pair of reinforcing tongues, integrally formed with a one-piece bracket, furnish supporting rigidity for the structure pedestal mounting area without the need for additional reinforcement members.

According to the construction of the present invention, the retention bracket pair of frame pedestal reinforcing tongues additionally provide displaced welding areas, obviating welding induced distortion of the retention bracket and pedestal. As a result, a bracket planar raceway surface is provided for the tapping plate allowing exact cross car and longitudinal sliding adjustment of the plate. Further, by preventing sheet metal welding distortion of the retainer bracket and pedestal flush mating surfaces, the invention maintains the critical close tolerance stack-up requirement of the installation.

It is another feature of the present invention to provide an improved tapping plate and retention bracket mounting assembly for attaching a front suspension cradle crossmember, in a four point rectangular pattern, to the vehicle body side rail members. As the frame side rails are sloped upwardly forming an arch to clear the vehicle front wheel wells, it is necessary that a forward pair of horizontally disposed pedestals be stamped in corresponding upwardly sloped side rail web portions. It is critical that the two frame pedestals define a common horizontal plane, insuring the smooth controlled sliding adjustment of their associated tapping plates to establish cross-car and longitudinal adjustment of a subjacent suspension cradle crossmember.

Further, as the suspension crossmember has close tolerance vertical stacking requirements, any distortion of the pedestals and/or the tapping plate mating central section surfaces will interfere with the vehicle suspension cradle crossmember being disposed at its design ground clearance level. Accordingly, the retention bracket forward and aft attaching tongues enable each bracket to be spot welded to its associated frame web portion, whereby the spot welds are displaced from the pedestal portion and its associated bracket central section, thereby obviating welding distortion thereof.

These and other features and advantages of the invention will be more fully understood from the following detailed description of the invention taken together with the accompanying drawings.

BRIEF DESCRIPTION OF THE DRAWINGS

In the drawings:

FIG. 1 is a fragmentary perspective view, with parts broken away, of a vehicle body frame side rail member supporting a suspension crossmember;

FIG. 2 is an enlarged view of the portion shown within the FIG. 1 circle denoted "2";

FIG. 3 is a fragmentary vertical sectional view taken on the line 3—3 of FIG. 2;

FIG. 4 is a fragmentary vertical sectional view taken on the line 4—4 of FIG. 3;

FIG. 5 is a fragmentary horizontal sectional view taken on the line 5—5 of FIG. 3; and FIG. 6 is a detail plane view of the sheet metal blank from which the tapping plate retainer is formed.

DETAILED DESCRIPTION OF THE INVENTION

Referring now to the drawings in detail, numeral 10 generally indicates in FIG. 1 an automobile body front frame structure having a frame right hand side rail member 11 extending longitudinally to a forward end 12. Although not shown in the drawings, a corresponding frame left hand side rail member is provided for the vehicle body. The pair of side rail members support a front suspension underbody cradle 13 by means of four fastener mounting assemblies.

It will be seen in FIG. 1 that the right hand side rail 11 provides forward 16 and aft 18 adjustable tapping plate and retention bracket mounting assemblies while the left hand side rail member has a duplicate mirror image pair of forward and aft tapping plate and retention bracket mounting assemblies. As the mounting assemblies 16 and 18 are substantially identical, only the forward assembly 16 will be discussed in detail.

The forward 14 and aft 15 suspension cradle crossmembers are interconnected by a plurality of longitudinal beam members, one of which is shown at 19. As the suspension cradle supporting structure geometrical arrangement requires a high degree of control stability to maintain wheel alignment, it is necessary that the two forward and two aft mounting assemblies allow precise longitudinal and cross-car simultaneous adjustment. It will be noted in FIG. 1 that the left and right hand forward mounting assemblies conjointly move in a common upper adjustment plane, while the left and right hand aft mounting assemblies conjointly move in a common lower adjustment plane, located a predetermined vertical dimension "X" below the common upper adjustment plane. It is, therefore, critical that the upper and lower adjustment planes be horizontally disposed parallel planes.

As seen in FIG. 1, the U-section sheet metal side rail 11 comprises vertically disposed inboard 20 and outboard 22 side flanges joined by a lower web 24. The web 24 comprises a longitudinally extending horizontal web portion 26 terminating in an aft upwardly sloped web portion 28. The sloped web portion 28 is, in turn, joined by a horizontal web pedestal 30 to a forward upwardly sloped web portion 32.

With reference to FIG. 2, the forward mounting assembly 16 is shown supported on the web pedestal 30. The forward assembly 16 comprises a retention bracket 40, enclosing a rectangular anchor or tapping plate 42, providing a limited range of movement of the plate 42 in both longitudinal and transverse directions.

Referring to FIG. 6, the retention bracket is adapted to be formed from a single blank "B", stamped from sheet metal. As seen in FIG. 2, the formed retainer 40 comprises a rectangular central section 50 together with inboard 52 and outboard 54 side walls shown upstanding, at right angle bends, from opposite longitudinal side edges of the central section 50. A top flange 56 extends outboard, at a right angle bend, from the upper end of the inboard side wall 52. As seen in FIG. 5 the top flange 56 has a longitudinally extending free edge 58 positioned adjacent upper free edge 60 of the outboard side wall 54.

FIG. 5 depicts the top flange 56 formed with an aperture in the form of a transverse slot 62 which is open at the top flange free longitudinal edge 58. The slot 62, which terminates at its inboard end in an internal semi-circular edge 64, has a transverse axis of symmetry 66, which intersects vertical axis 68, aligned on the center of curvature of the internal semi-circular edge 64.

As seen in FIGS. 4 and 6, the bracket central section 50 includes a circular oversize hole 70 having its center aligned on the principal axis 68. Further, an oversize circular hole 72, formed in the mounting pedestal 30, also has its center aligned on the principal axis 68. It will be noted that bracket forward 74 and aft 76 end walls are shown downstanding, at right angle bends, from opposite transverses edges of the bracket top wall 56.

Referring to FIG. 4, the tapping plate 42 is shown with a planar undersurface 78 in face-to-face overlying sliding contact with upper planar raceway surface 79 of the bracket central section 50, whereby the plate 42 is adapted for controlled longitudinal and transverse sliding movement on its upper raceway surface. A threaded bore 80 extends through the tapping plate 42 and an annular upstanding boss 82 formed on an upper surface 83 of the plate. It will be seen in FIGS. 4 and 5 that, with the tapping plate 42 in its centered position, the bore 80 is aligned on vertical axis 68. Thus, the bore 80 is aligned with oversize bracket hole 70 and pedestal hole 72, together with the center of curvature of bracket slot semi-circular edge 64.

It will be appreciated that the tapping plate upstanding boss 82, shown in FIG. 4, provides increased internal thread length for the reception of a threaded mounting bolt 84. In addition, by virtue of being received in the top flange slot 62, the boss 82 functions to limit the movement of the tapping plate 42 relative to the bracket 40. FIG. 5 shows boss 82 adapted to control the inboard, forward, and aft movement of the tapping plate 42 from its centered position on the vertical axis 68.

As seen in FIG. 5, the tapping plate bore 80 is symmetrically disposed about the intersection of the slot transverse axis of symmetry 66 with longitudinal axis 81, which intersection includes the vertical axis 68. The top flange slot 62, the bracket central section oversize hole 70, and the pedestal oversize hole 72 are sized and adapted to allow access to the tapping plate threaded bore 80 by the bolt 84, within the controlled range of longitudinal and transverse movement of the tapping plate 42.

With reference to FIGS. 2, 4, and 5, the bracket 40 is shown formed with aft 85 and forward 86 tongues extending from respective aft 88 and forward 90 bracket transverse bend lines. As illustrated in FIG. 4, the forward attachment tongue 86 slopes upwardly, at a predetermined obtuse angle, matching the included obtuse angle defined by the pedestal 30 and the frame forward web portion 32. In the same manner, the aft attachment flange 85 is sloped downwardly, at a predetermined obtuse angle, matching the included obtuse angle defined by the pedestal 30 and the aft web portion 28. Upon the forward 86 and aft 85 tongues being welded to their underlying forward 32 and aft 28 side rail web portions at weld points 104, the bracket central section 50 is fixedly retained in face-to-face abutting relation on planar upper surface 92 of the pedestal 30.

FIG. 5 shows the horizontally disposed pedestal 30 being formed in the upwardly sloped side rail web by means of aft 94 and forward 96 obtuse angle transverse bend areas which are subjected to high localized stresses. As the frame web 24 is formed from sheet metal, having relatively low rigidity, it is common practice to reinforce the web by stiffeners where a tapping plate is to be installed.

To improve the strength and fatigue performance of the bend areas 94 and 96 by adding stiffeners, however, was not feasible because of the close tolerance vertical stacking requirements of the pedestal mounts. Further, it is essential that the pedestal 30 provide an upper planar surface 92 for face-to-face mating with the overlying tapping plate central section 50. Providing a planar raceway surface 79 and preserving the close tolerance stack-up dictates avoiding any welding in the pedestal 30 and the bracket center section 50 areas because of resultant sheet metal distortion. Applicants' tapping plate and retention bracket assembly solves both problems by providing the required reinforcement rigidity for the pedestal to web bend areas 94 and 96 without the need for reinforcement stiffeners.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A tapping plate and retention bracket assembly for a vehicle frame web comprising:

a sheet metal retention bracket for mounting a tapping plate, said bracket having a rectangular central section, inboard and outboard side walls upstanding at right angle bends from opposite longitudinal side edges of said section, an apertured top flange extending outboard at right angles from the upper end of said inboard side wall, said top flange having fore and aft end walls downstanding from opposite transverse edges thereof and a longitudinal free edge adjacent an upper free edge of said outboard side wall;

said central section having an oversize hole aligned with said top flange aperture on a vertical axis, and forward and aft attachment tongues each extending at an obtuse angle bend from associated opposite forward and aft transverse end edges of said section; and a tapping plate adapted to overlie said bracket central section for controlled movement relative thereto, said plate having a central threaded bore therethrough adapted for alignment on said axis for receiving a fastener, said tapping plate positioned between said fore and aft end walls and below said top flange; whereby with said bracket central section adapted for flush contact with a frame horizontal web pedestal, said forward and aft tongues are adapted for flush welding attachment with associated forward and aft sloped web portions with said tongues providing reinforcement of the pedestal.

2. The assembly as set forth in claim 1 wherein said top flange aperture is in the form of a transverse slot which is open at said top flange free edge, said slot terminating at its inboard end in a semi-circular internal edge having its center of curvature aligned on said axis.

3. The assembly as set forth in claim 2 wherein said tapping plate has an upper surface formed with an upstanding annular boss extending through said slot, said tapping plate bore extending through said boss, whereby said boss, together with said outboard wall, control the longitudinal and transverse movement of said tapping plate relative to said bracket.

4. The assembly as set forth in claim 1 wherein said forward tongue is sloped upwardly and said aft tongue is sloped downwardly for flush welding attachment with associated forward and aft sloped web portions.

5. The assembly as set forth in claim 1 wherein said bracket is formed from a single blank of sheet metal.

6. In an automotive vehicle frame construction for mounting a subjacent member, the combination comprising:

a frame member having a web formed with a horizontally disposed planar pedestal, formed with an oversized hole therein, interconnecting forward and aft sloped web portions;

a retention bracket mounting a tapping plate on said pedestal, said bracket welded to said frame member, said bracket being formed from a single blank of sheet material comprising a rectangular central section having an oversized hole therethrough, wherein said section oversized hole and said pedestal oversized hole have their centers aligned on a common vertical axis;

inboard and outboard side walls upstanding at right angle bends from two opposed longitudinal edges of said retention bracket central section, a top flange extending outboard at right angles from the upper end of said inboard side wall, said top flange having fore and aft end walls downstanding from opposite transverse edges thereof and a longitudinal free edge adjacent an upper free edge of said outboard side wall, said top flange formed with aperture means aligned on said axis;

forward and aft oppositely extending reinforcement tongues sloped at obtuse angle bends from two opposite transverse end edges of said section, whereby said forward tongue is adapted to overlie, in a flush manner, said forward sloped web portion and said aft tongue is adapted to overlie, in a flush manner, said aft sloped web portion; and a tapping plate overlying said bracket central section for controlled movement relative thereto, said tapping plate having a threaded bore therethrough adapted for alignment on said axis for receiving a threaded fastener therethrough; whereby upon said forward and aft tongues being welded to their associated forward and aft web portions such that bend areas between said pedestal and said web portions are rigidly reinforced while said bracket central section is retained on said pedestal in flush relation therewith without any welding of said central section, thereby obviating distortion of said central section and said pedestal.

7. The construction as set forth in claim 6 wherein said top flange aperture means is in the form of a transverse slot which is open at said top flange free edge, said slot terminating at its inboard end in a semi-circular internal edge, said internal edge having its center of curvature aligned on said axis; and said tapping plate having an upper surface formed with an upstanding annular boss received in said top flange slot with said tapping plate bore extending through said boss in a concentric manner; whereby said annular boss controls the inboard, forward, and aft movement of said tapping plate and said bracket outboard wall controls the outboard movement of said tapping plate.

8. The construction as set forth in claim 6 wherein said forward tongue and said forward web portion are sloped upwardly at a predetermined obtuse angle and said aft tongue and said aft web portion are sloped downwardly at a predetermined obtuse angle.

9. The construction as set forth in claim 6 wherein said frame member has a U-section, comprising vertically disposed upstanding side flanges joined by said web.

* * * * *